ABRAHAM LICHOWSKY
INVENTOR.

BY Nathan N. Kallman

ATTORNEY

SERVO CONTROLLED DRIVE MECHANISM

Filed June 1, 1962

3 Sheets-Sheet 2

ABRAHAM LICHOWSKY
INVENTOR.

BY Nathan N. Kallman

ATTORNEY

SERVO CONTROLLED DRIVE MECHANISM

Filed June 1, 1962

ABRAHAM LICHOWSKY
INVENTOR.
BY Nathan N. Kallman
ATTORNEY 3,215,918

SERVO CONTROLLED DRIVE MECHANISM

Abraham Lichowsky, San Carlos, Calif., assignor to Ampex Corporation, Redwood City, Calif., a corporation of California Filed June 1, 1962, Ser. No. 199,544
16 Claims. (Cl. 318—302)

This invention relates to arrangements for controlling the speed of an electric motor and more particularly to such an arrangement for providing a regulated motor speed at any one of a number of selected levels.

In drive arrangements for magnetic tape transport mechanisms, as well as in other similar applications, it is extremely important to develop an output speed that is as constant as possible at a selected speed setting. On the other hand, it is desirable to be able to adjust this speed to a number of different settings with a minimum time required to change between different speeds. This latter requirement is imposed in order that the tape may be transported at a number of different preselected speeds.

A considerable number of different arrangements are known for controlling the speed of an electric motor. In general, direct current (D.C.) motors are more suitable for applications where the motor speed is to be varied over a substantial range of operation, while alternating current (A.C.) motors are desirable for their capability of providing substantially constant speed output related to the frequency of the A.C. energy source. It will be appreciated that special problems may arise when a single arrangement is desired that combines the operating advantages of both types of motors. These problems become particularly acute when the selected motor control arrangement is to be used in a magnetic tape transport wherein even slight variations in output speed may be manifested as distortions in the signals that are stored upon or read from the tape.

Previously known arrangements for controlling the speed of a magnetic tape transport mechanism have not been entirely satisfactory. Such arrangements have in general been limited, either in the range of speeds that are available at the output of the drive mechanism, or in the lack of proper regulation of the drive mechanism at given preselected speeds of operation. Generally, when defining the speed range of a tape recorder, it is customary for engineers in the tape recording industry to refer to the number of binary multiples of the lowest available operating speed (sometimes designated as the number of octaves). Thus, if a tape apparatus had six operational speeds, the operating range would be five octaves. With the increased dependence of present day information storage and data processing systems upon the use of magnetic tape as a storage medium, it is important that the above mentioned limitations in previously known tape drive mechanisms be overcome.

It is therefore an object of the present invention to provide an improved speed controlled drive arrangement for a tape transport mechanism.

It is also an object of this invention to provide an improved speed controlled tape drive arrangement that is capable of delivering rotational power at a large number of preselected speeds.

It is a further object of the invention to provide a rotational drive arrangement capable of improved regulation at a variety of preselected speeds.

An additional object of the invention is to provide an improved response and positive control in changing between speed settings of a tape transport mechanism.

Briefly, tape transport drive mechanisms in accordance with the present invention may comprise an electric drive motor, the rotational speed of which is controlled by a combination of two techniques. These techniques relate respectively to the control of applied braking force and the control of electrical power to the motor in response to signals developed in a feedback loop. By virtue of these control arrangements, a push-pull effect is achieved whereby the respective characteristics of the individual control techniques advantageously compensate each other, thus providing an improved operation resulting from the enhanced linearity in the relationship between the change in feedback signal and the change in motor torque.

One specific arrangement, in accordance with the invention, employs a motor having a hysteresis brake that is part of a feedback loop coupled to a tachometer rotating with an output shaft in order to provide the desired speed regulation. In addition, the feedback loop is coupled to a controllable impedance that is connected in series with the drive windings receiving electrical power from the A.C. source. The feedback loop also includes a speed selector switch and comparison circuits that control both the magnitude of the series impedance and the amount of current that is fed to the hysteresis brake, in accordance with the speed setting of the selector switch and the tachometer signals indicative of actual motor speed. One comparison circuit, referred to as the time base comparator, develops an error signal as a function of deviation from a preset timing reference for coarse regulation of the selected speed. The other comparison circuit, designated a phase comparator, develops an error signal as a function of phase displacement from a specified frequency standard, which may be the 60 cycle line frequency. The error signal from the phase comparator assumes control of the motor speed regulator as the time base comparator signal approaches an equilibrium setting, thus providing a fine control of the selected speed.

By virtue of this arrangement, the output torque of a motor shaft may be controlled very precisely to develop a selected rotational velocity. Furthermore, the motor drive arrangement may be operated at almost stall speed in order to obtain controlled velocity down to a very few revolutions per minute. The arrangement described renders the speed of the motor variable over an extremely wide range, which is limited only by the resolution of the tachometer at the low end and by the synchronous speed of the motor at the high end. At the same time, extremely good speed regulation is obtained at any one of the considerable number of available speed levels that may be selected in this range. Operation of the motor is provided at substantially constant torque over its entire available speed range and with relatively little variation in power dissipation for the various selected speeds. In addition, an improved control of motor speed is achieved by virtue of the increased linearity in the relationship between differential output torque and the error signal developed by the feedback loop.

A second arrangement in accordance with the invention develops a hysteresis braking effect in the motor drive windings in conjunction with the control of the A.C. power applied to the drive windings. In this arrangement a hysteresis motor is employed that uses an iron-cobalt material as part of the rotor in order to develop synchronous operation through utilization of the hysteresis characteristic of this material. Connected in series with the motor windings, there are arranged in parallel with each other and in opposite polarity connection a diode rectifier and a silicon controlled rectifier. The control electrode of the silicon controlled rectifier is connected to the output circuit of the feedback loop so that conduction in the silicon controlled rectifier is controlled by the magnitude of the feedback error signal.

This arrangement provides both D.C. and A.C. components in the electrical waveform applied to the motor windings, and varies the relative magnitudes of the respective components in accordance with the error signal from the feedback loop to produce a braking force that varies inversely with relation to the level of A.C. energization. The control of the D.C. and A.C. components of the voltage applied at the motor windings in this manner advantageously achieves a push-pull effect by which the individual results of the two components tend to compensate each other to provide an enhanced linearity in the relationship between the developed error signal and the differential torque which is produced to vary the motor speed.

A better understanding of the present invention may be had from a consideration of the following detailed description, taken in conjunction with the accompanying drawings, in which.

Figure 1:
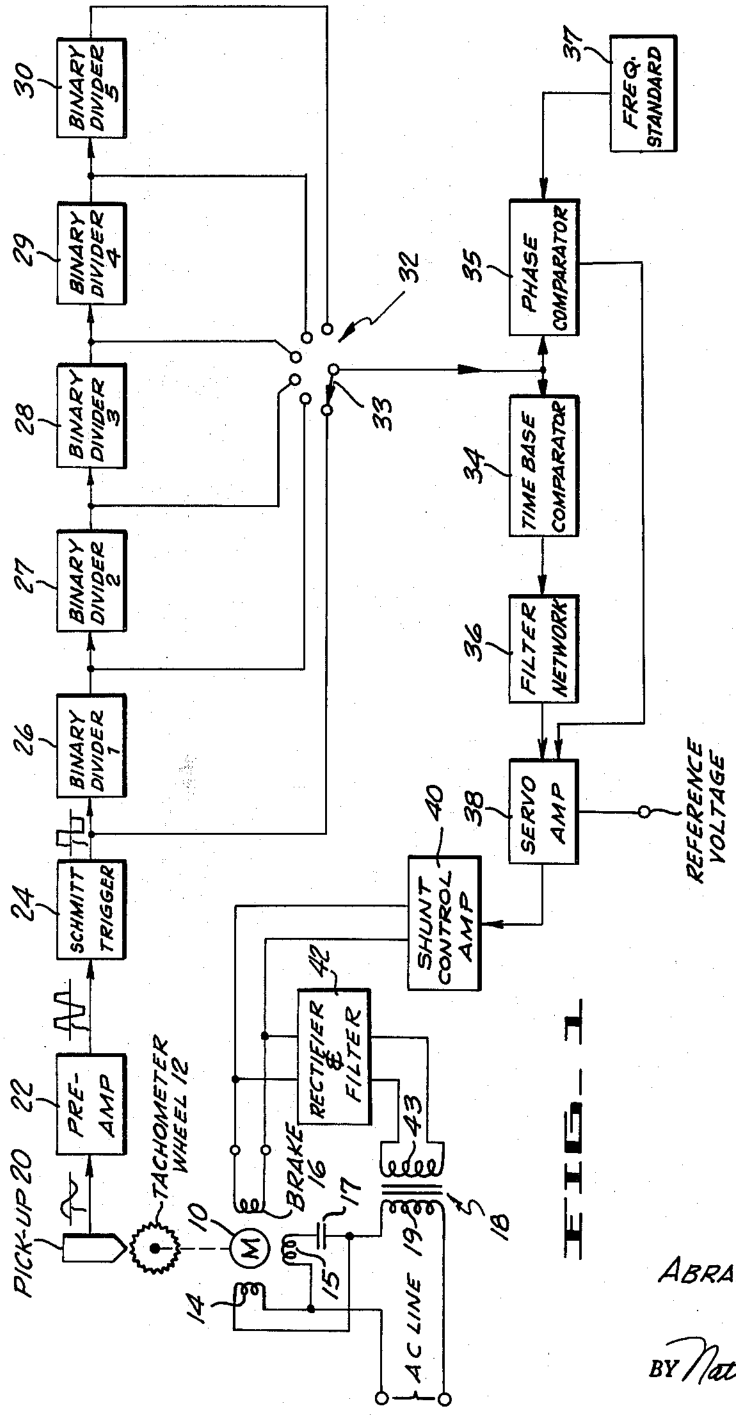
FIGURE 1 is a block diagram representing one arrangement in accordance with the invention.

The block diagram of FIGURE 1 represents a simplified form of one arrangement of the invention for driving a tape transport mechanism. In the system of FIGURE 1, a drive motor 10 is shown coupled to a tachometer wheel 12. In the operation of the system, tape motion is obtained by means of a rotating capstan (not shown) that may be an extension of the drive motor shaft. The tachometer wheel 12 may be in the form of a flywheel having a number of slots regularly spaced around the periphery thereof in order to provide a variation in the inductive coupling with the tachometer pickup when the wheel 12 is rotated. The drive motor 10 is shown having three windings 14, 15 and 16. The windings 14 and 15 are connected to the A.C. power supply line and serve as the drive windings for the motor 10. A capacitor 17 is connected in series with the winding 15 in order to provide a phase shift in the respective fields developed by the windings 14 and 15. It will be noted that the windings 14 and 15 are in series with a winding 19 of a transformer 18. The winding 16 is a brake winding that may be positioned to apply a braking effect to the rotor of the motor 10 or it may be a winding of a hysteresis brake unit coupled to the motor shaft.

Signals corresponding to the rate of rotation of the tachometer wheel are generated by the tachometer pickup 20 and applied to a preamplifier 22. From the output of the preamplifier 22 the amplified signals are applied to a Schmitt trigger circuit 24 which develops a rectangular waveform in accordance with the frequency of the signals developed by the tachometer pickup 20. Following the trigger circuit 24 there are a number of binary divider stages 26–30, each of which produces an output signal having exactly half the pulse rate of the signal applied to its input circuit. Thus the signals present at the outputs of the respective binary divider stages 26–30 are binary subharmonics of the frequency of the signal generated by the tachometer pickup 20.

From the individual outputs of the trigger stage 24 and each of the binary stages 26–30 connections are provided to separate terminals of a speed selector switch 32. Each of these connections corresponds to a particular motor speed that may be selected by the system operator. From an armature 33 of the selector switch 32 connections are provided to a time base comparator stage 34 and to a phase comparator stage 35, which is connected to a frequency standard 37. The output of the time base comparator stage 34 is fed through a filter network 36 to a D.C. servo amplifier 38. Similarly the output of the phase comparator stage 35 is applied to the amplifier 38. The servo amplifier 38 is also provided with a reference voltage signal in order to produce an output signal that is a function of the difference between the signals received from the comparators 34, 35 and the reference voltage signal. The output signal from the servo amplifier 38 is coupled to a shunt control amplifier 40 connected in parallel with the brake winding 16 of the drive motor 10. A rectifier and filter stage 42 is connected to the output circuit of the control amplifier 40 and across the brake winding 16 and a winding 43 of the transformer 18.

In the operation of the arrangement depicted in FIGURE 1, an output signal that is substantially in the form of a sine wave is developed by the pickup 20 from the rotating tachometer wheel 12. This output signal is a function of the motor shaft speed and the number of teeth on the tachometer wheel 12. The signal from the tachometer pickup 20 is fed to the preamplifier 22 where it is amplified in order to steepen the waveform at the zero crossings. The signal at the output of the preamplifier 22 thus appears, due to saturation effects, as a clipped sinusoidal waveform that is applied to the Schmitt trigger stage 24 where the waveform is regenerated as a series of rectangular pulses. The train of pulses provided at the output of the trigger stage 24 may be applied directly to the time base comparator stage 34 or may be divided in frequency before application to the stage 34, depending upon the setting of the speed selector switch 32. It should be understood, however, that the signal which is present at the armature 33 of the speed selector switch 32 has the same nominal center frequency for any selected speed, once the drive motor 10 has stabilized at that speed.

The time base comparator stage 34 includes a fixed delay time base reference and thus provides a symmetry-modulated rectangular waveform as an indication of the comparison of the period of the signal present at the input of the time base comparator stage with the delay of its own time base reference. The symmetry-modulated output waveform of the time base comparator stage 34 carries a D.C. component having a polarity and magnitude corresponding to the direction and degree of correction needed to make the motor speed correspond with the selected speed. The output signal from the time base comparator stage 34 is filtered by the low pass filter network 36 wherein the bandwidth of error signal information is limited to exclude the fundamental and harmonic frequencies of the time base comparator sampling rate and undesirable high frequency noise. The D.C. and residual low frequency A.C. components representing the dynamic behavior of the motor drive shaft are applied to the servo amplifier 38 for comparison with a fixed reference voltage in a differential amplifier that is part of the servo amplifier 38. Superimposed on the signal applied to the amplifier 38 is the phase error information generated by the phase comparator 35. The amplified potential difference that represents the derived error voltage is then applied to the shunt control amplifier 40 to control the internal impedance thereof. Because the shunt control amplifier 40 is in parallel with the brake winding 16, across a rectifier and filter stage 42 having a relatively high internal impedance, any reduction in the impedance presented by the shunt control amplifier 40 reduces the current that is directed to the brake winding 16, thus reducing the braking torque developed thereby. At the same time this effect serves to lower the impedance across the secondary winding 43 of the transformer 18, thus reducing the reflected impedance that is presented across the winding 19 in series with the motor drive windings 14 and 15 and so developing increased accelerating torque in the motor drive windings 14 and 15. The net effect is an increase in motor speed in accordance with the developed error signal of the described polarity.

Should the detected error voltage that is applied from the servo amplifier 38 to the shunt control amplifier 40 be of the opposite polarity, the impedance of the shunt control amplifier 40 is increased with the result that additional current is applied to the brake winding 16 to develop more braking torque. In turn, the increase in braking torque causes a reduction in the energization of the drive windings 14 and 15 and a reduced accelerating torque is effected by an increase in the reflected impedance presented by the transformer winding 19. In consequence, the speed of the motor 10 is maintained as determined by the setting of the speed selector switch 32 and the delay of the time base comparator 34.

The composite operation of the brake winding 16 and the impedance presented by the transformer winding 19 in circuit with the drive windings 14 and 15 provides the advantage of a substantially linear relationship between the error voltage and the correcting torque provided at the motor 10 in response thereto, making it possible to attain a high degree of damping in the electromechanical portion of the system and minimizing both the peak and average power dissipation required by the system to cover the entire dynamic range of speed regulation.

In accordance with an aspect of the invention, the described arrangement produces an operation of the motor brake winding 16 and the power applied to the drive windings 14 and 15 in a push-pull relationship to achieve linear control of motor torque. Motor control alone exhibits an essentially square law characteristic that presents particular problems in the design of a servo loop arrangement for utilizing these techniques. However, by utilizing both techniques together in the described arrangement in accordance with the invention, the particular characteristic of each serves to compensate for that of the other to combine in providing the desired linear relationship, thus achieving the advantages of a push-pull system. In addition to achieving the above described linear relationship between error voltage and correction torque, the described arrangement introduces a significant degree of damping in the electromechanical system, thus improving the inherent stability of the servo loop. Finally, the current supplied to the brake winding 16 is derived from the A.C. line via the transformer 18 and the rectifier stage 42. At the same time, the transformer 18 is employed to control the power supplied from the A.C. line to the motor drive windings 14 and 15 by virtue of the reflected impedance from the transformer load circuit to the serially connected primary winding 19. Thus an economy of component circuitry and power is advantageously effected in accordance with this arrangement of the invention.

Figure 2:
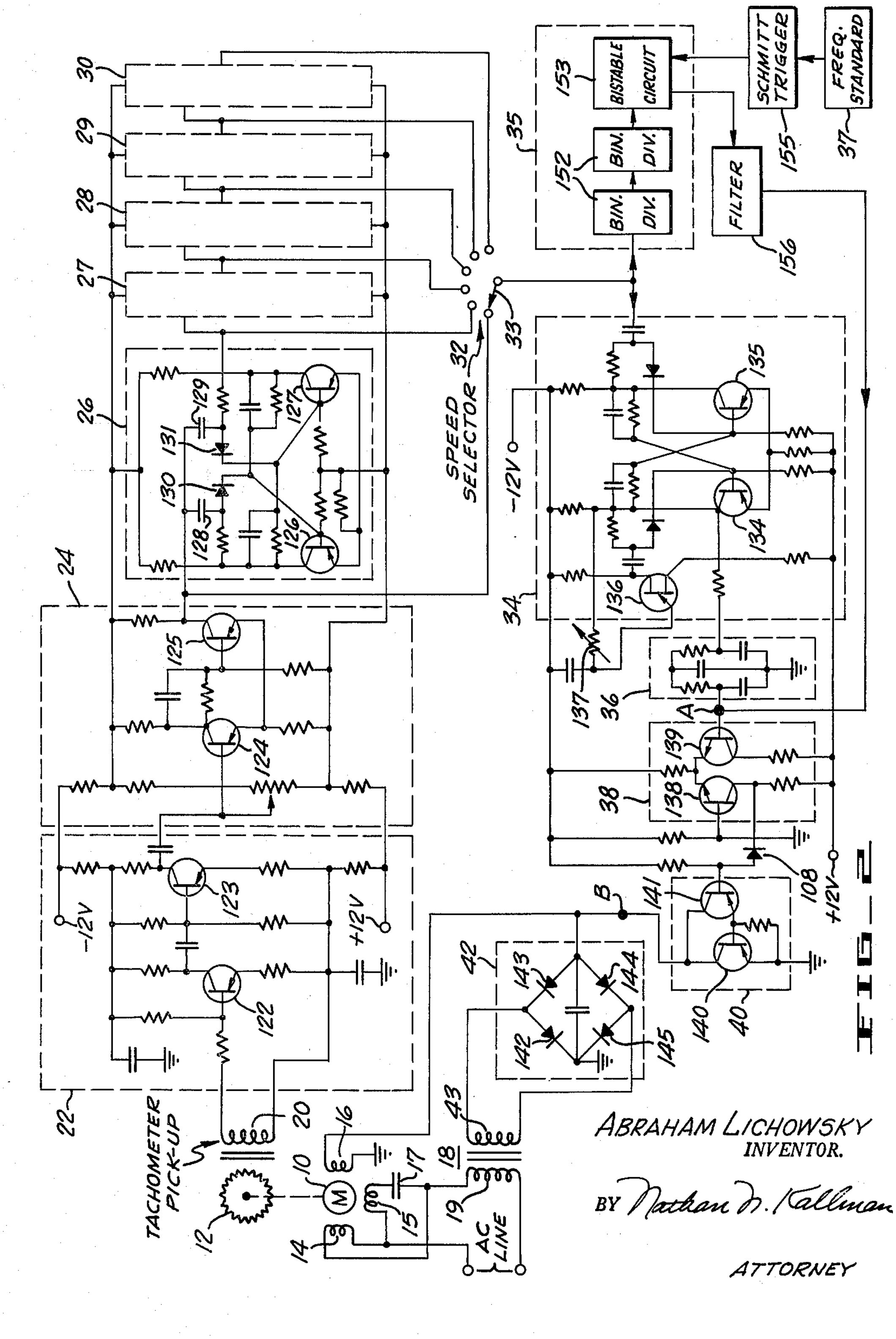
FIGURE 2 is a combination block and schematic diagram of the arrangement represented in FIGURE 1.

The details of particular portions of one arrangement of the invention are shown in FIGURE 2 which is a circuit diagram corresponding to the block diagram shown in FIGURE 1. Here as in FIGURE 1, the mechanical coupling between the motor 10 and the tachometer wheel 12 is indicated by a broken line. The signal corresponding to the rotation of the tachometer wheel 12 is developed by a tachometer pickup 20 in the form of an inductive winding adjacent to the periphery of the tachometer wheel 12. The signal from the tachometer pickup 20 is amplified in a preamplifier 22 comprising a pair of transistors 122 and 123. The signal developed at the collector of the transistor 123 is coupled to the input of a first transistor 124 which, with a second transistor 125, comprises a Schmitt trigger stage 24. The threshold level at which the transistor 124 is triggered may be adjusted by a bias potentiometer 110.

A number of binary frequency dividing stages 26–30 are connected in tandem following the transistor 125. These binary frequency divider stages 26–30 are substantially identical to each other so that only one of them need be shown in detail. The first binary frequency divider stage 26 is shown comprising a pair of transistors 126 and 127 in a bistable triggering configuration. Positive pulses received from the collector of the transistor 125 are applied to respective bases of the transistors 126 and 127 through capacitors 128 and 129 and gating diodes 130 and 131. Each positive pulse so applied turns off that particular transistor, 126 or 127, which happens to be conducting at the time and the nonconducting transistor is switched into conduction. Thus each positive pulse developed at the collector of the transistor 125 produces a switching of the bistable circuit 26 so that two complete pulse cycles at the input circuit of the stage 26 produces one complete cycle at the output thereof. Each binary divider stage 26–30 provides a frequency division by two so that the speeds that are available in this arrangement of the invention for the operation of a tape transport mechanism, range by way of example, from $\frac{15}{64}$ inch per second to $7\frac{1}{2}$ inches per second in multiples of two. (See FIGURE 1.)

The signal that is selected by the speed selector switch 32 is applied to the time base comparator stage 34 comprising transistors 134 and 135 together with a fixed delay time base reference stage including a unijunction transistor 136 operating in conjunction with the transistor 134. The circuit of the unijunction transistor 136 operates as a gated relaxation oscillator to provide a stable time base reference for the comparison circuit comprising the transistors 134 and 135. The delay or time base of the gated relaxation oscillator circuit of the unijunction transistor 136 may be varied within a predetermined range by means of a potentiometer 137. However, during the normal operation of the system, the delay of this circuit is fixed. The circuit comprising the transistors 134 and 135 is a bistable configuraton having dual input paths. This bistable circuit is switched to one stable state by an input signal from the speed selector switch 32 and is switched to the other stable state by an input signal received from the circuit of the unijunction transistor 136.

Figure 3:
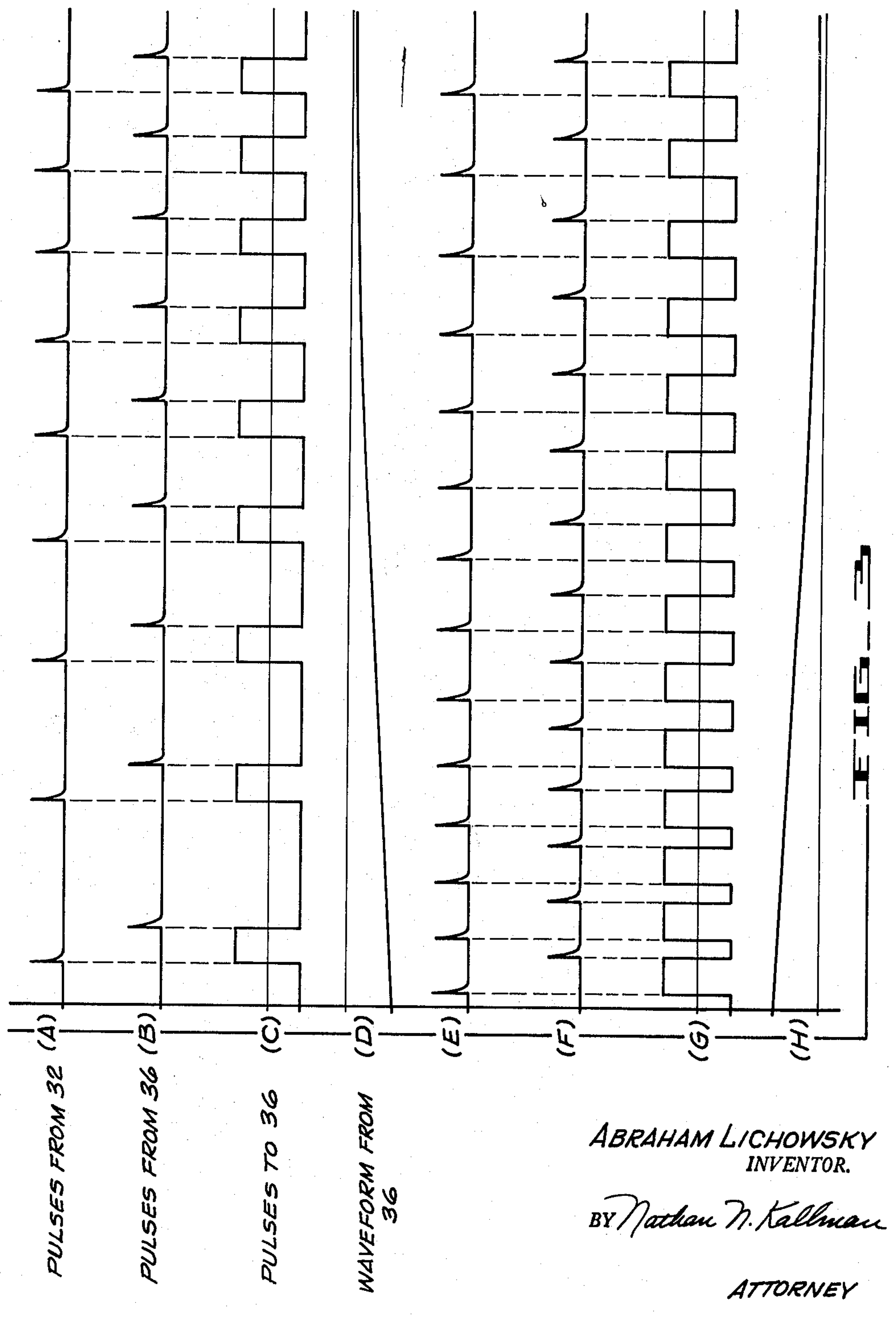
FIGURE 3 depicts a series of waveforms for the purpose of presenting a better understanding of the operation of the invention.

The operation of the time base comparator stage 34 may be better understood by referring to the waveforms depicted in FIGURE 3. In this figure, waveform A represents signals applied to the base of the transistor 135 from the armature 33 of the speed selector switch 32. As represented in waveform A, these signals correspond to an increase in speed as the motor 10 picks up to a higher speed setting. Each of these signal pulses serves to turn off the normally conducting transistor 135 which, when turned off, turns on the normally off transistor 134. As the transistor 134 turns on, a negative potential is applied from its collector to the base of the unijunction transistor 136. This potential is delayed by the RC network connected to the base of the transistor 136, which finally triggers on after a preset delay and applies a positive signal to the base of the transistor 134, which then turns off and restores the time comparator stage 34 to its initial condition. Waveform B of FIGURE 3 represents the pulses applied from the collector of the unijunction transistor 136 to the base of the transistor 134. It will be noted that the pulses of waveform B follow the corresponding pulses of waveform A by a fixed time interval.

Waveform C of FIGURE 3 represents the voltage present at the collector of the transistor 134 that is applied to the input of the filter 36. The width of the positive pulses in waveform C corresponds o the fixed delay between the respective pulses of waveforms A and B. Filtering the waveform C produces at the point A of FIGURE 2 a signal having a negative D.C. component as shown in waveform D. This signal is applied to the servo amplifier transistor 139 for comparison with a fixed reference potential developed by the transistor 138. The resulting error signal is applied via a zener diode 108 to the shunt control amplifier 40, comprising the transistors 140 and 141, to control the current supplied to the brake winding 16 from the rectifier and filter 42, comprising the diodes 142, 143, 144 and 145. Concurrently, the reflected impedance in the winding 19, controlled by the load of the winding 43 of transformer 18, produces a corresponding change in the current applied to the drive windings 14 and 15 with the net result that the motor 10 increases speed to match the setting of the speed selector 32.

Waveforms E, F, G and H of FIGURE 3 correspond respectively to the waveforms A, B, C and D, described above, with the exception that these waveforms correspond to a decreasing speed of the motor 10. In each case, the result is the development of an error signal of a particular polarity indicating the direction of speed change to be effected and diminishing in amplitude as the motor speed changes to correspond to a selected speed.

As the error signal from the time base comparator stage 34 approaches zero, a second error signal developed by the phase comparator stage 35 comes into play to provide a fine control for regulating the torque and speed of the motor 10. In FIGURE 2 the signals present at the armature 33 of the speed selector switch 32 are applied via successive binary divider stages 152 to a bistable circuit 153 which may be similar to the circuit comprising the transistors 134 and 135. In this arrangement, the frequency standard 37 is represented as the 60 cycle A.C. line frequency, and the binary dividers 152 serve to develop a pulse repetition rate which corresponds to the 60 cycle line frequency. The sinusoidal voltage from the frequency standard 37 is converted to a train of pulses by the Schmitt trigger 155 and these pulses are applied to the bistable circuit 153 for phase comparison with the pulses received from the binary dividers 152 in the manner already described with respect to the bistable circuit of the transistors 134 and 135. The output of the bistable circuit 153 is a symmetrical square waveform when the two pulse trains are 180° out of phase. A phase lead or lag from this center position causes a corresponding change in symmetry, and the D.C. component of corresponding polarity. This variable symmetry error signal is filtered in a filter stage 156, and the resulting D.C. component is applied to the point A, coupled to the base of the transistor 139, as a phase error signal to complete the fine control of the motor 10. Thus when motor speed is brought within the range of control of the phase comparator stage 35 by the time base comparator stage 34, in effect, control of motor speed shifts to the phase error signal developed by the phase comparator stage 35 as described.

Figure 4:
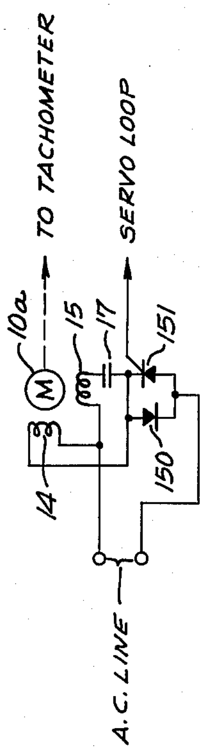
FIGURE 4 is a schematic diagram of a circuit that may be substituted for a portion of the circuit of FIGURE 2 to provide a second specific arrangement in accordance with the invention.

A somewhat different arrangement in accordance with the invention may be realized by substituting the circuit depicted schematically in FIGURE 4 for a portion of the circuit shown in FIGURE 2. In this arrangement, a motor 10A of the hysteresis type, known in the art, is employed. A motor of this type may be braked through utilization of the increased hysteresis loss developed in its rotor upon the application of an electrical waveform containing a D.C. component to the motor drive windings. Thus, hysteresis braking is achieved without the need for a separate brake winding or the associated circuitry usually required to energize such a brake winding.

In FIGURE 4, the motor 10A is shown having drive windings 14 and 15 with a capacitor 17 in series with the winding 15 to provide the desired phase quadrature operation. In series with the drive windings 14 and 15 in the circuit across the A.C. line is a variable impedance network comprising the diode rectifier 150 in parallel with the silicon controlled rectifier 151. The circuit of FIGURE 4 may be connected in the circuit of FIGURE 2 at the point B coupled to the rectifier and filter 42 in FIGURE 2.

In the operation of this circuit arrangement of the invention, the rectifier 150 conducts current in one direction to the drive windings 14 and 15 in response to half-cycles of appropriate polarity in the A.C. voltage across the lines. Conduction of current in the opposite direction for half-cycles of the opposite polarity may be controlled by the signal applied to the control electrode of the silicon controlled rectifier 151. Thus the relative magnitude of the D.C. and A.C. components of the electrical power waveform applied to the drive windings 14 and 15 is varied in response to the magnitude and polarity of the control signal from the servo loop to produce the results already described in connection with the circuit of FIGURE 2.

A similar push-pull effect is achieved through the use of the arrangement of FIGURE 4 in conjunction with the feedback circuitry depicted in FIGURE 2, since this arrangement also provides for the inverse variations in the D.C. and A.C. components at the drive windings 14 and 15. As the D.C. component diminishes and the A.C. component increases, the braking effect is reduced and additional drive is supplied to the windings 14 and 15 to cause the motor 10A to rotate at a faster rate. Should the opposite situation obtain whereby the A.C. drive is decreased while the D.C. component applied to the windings 14, 15 is increased, the motor 10A is caused to slow down. Accordingly, speed regulation is precisely maintained at the setting selected by an operator.

By virtue of the above described arrangements of the invention, a versatile, although accurate and precise, arrangement for the control of the rotational speed of an electric drive motor is provided in a simple, reliable and economical configuration. This arrangement is particularly adapted for the described use in controlling a magnetic tape transport drive mechanism through the provision of suitable speed regulation at any one of six available speed levels, by way of example, that may be selected at the option of an operator. Additional speed levels within the range of operation of the arrangement may be provided through the addition of extra binary frequency divider stages with appropriate connections to the speed selector switch in the manner already illustrated. Also, speed levels other than the binary multiples of any given speed may be provided by variations in the setting of the potentiometer 137.

Although there has been described above one specific arrangement of a servo controlled tape drive mechanism in accordance with the invention for the purpose of illustrating the manner in which the invention may be used to advantage, it will be appreciated that the invention is not limited thereto.

What is claimed is:

1. A motor controlling arrangement for regulating a motor at a preselected speed comprising:

a drive motor having continuously energized drive and brake windings;

means for connecting the drive winding to a source of electrical power;

a speed detector mechanically coupled to the motor;

means for selecting a desired speed of rotation for said motor coupled to the speed detector;

means coupled to the speed selector and adapted to receive electrical signals indicative of the motor speed for generating a correction signal proportional to the deviation of motor speed from selected speed;

and means responsive to the generated correction signal for varying the energization of the brake and the drive windings of the motor in opposite senses in order to cause the motor speed to correspond to the selected speed.

2. A motor controlling arrangement for regulating a variable speed motor comprising:

a drive motor having continuously energized brake and drive windings;

means for connecting the drive windings to a source of power;

a speed detector for providing an indication of the motor speed;

a speed selector that is operable to select a desired one of a number of different motor speeds;

means for effecting a comparison between such indication of actual motor speed and the selected speed;

means for generating a correction signal in response to said comparison having a magnitude and polarity corresponding to the degree and direction of deviation of the indicated motor speed from the selected speed;

and means responsive to said correction signal for varying the energization of the brake and motor drive windings in opposite senses in order to cause the speed of the motor to coincide with the selected speed.

3. A motor controlling arrangement for regulating the speed of an electric motor at a preselected level comprising:

a drive motor having continuously energized drive and brake windings;

means for connecting the drive windings to a source of power;

speed detecting means coupled to the motor for generating alternating electrical signals having a frequency indicative of the motor speed;

a frequency divider chain for successively dividing the frequency of the alternating electrical signals to provide integral subharmonics thereof;

a speed selector switch connected to the frequency divider chain for selecting one of said subharmonic frequencies;

a fixed time delay stage triggered by the selected subharmonic signal;

means for comparing the selected subharmonic frequency with a signal from the fixed time delay stage and for generating a correction signal indicative of said comparison;

and controllable impedance means responsive to said correction signal for varying the degrees of energization of the brake and of the drive windings of the motor in opposite senses in order to cause the motor speed to coincide with the speed setting of the selector switch.

4. An arrangement for automatically controlling an electric motor in accordance with a preselected speed setting comprising:

a drive motor having continuosly energized brake and drive windings;

a speed detector coupled to the motor for generating an alternating electrical signal having a frequency indicative of motor speed;

a frequency dividing chain coupled to the speed detector for developing successive binary subharmonics of the alternating signal;

a speed selector switch connected to the frequency divider chain for selecting a particular subharmonic signal;

a fixed time delay pulse generator responsive to the selected subharmonic signal;

a time base comparison means including a bistable circuit having separate input leads for switching the bistable circuit between respective stable states, one input lead being connected to the pulse generator and the other input lead being coupled to the speed selector switch;

means for developing a D.C. signal having a magnitude and polarity corresponding to the departure from symmetry of the output of the bistable circuit;

and controllable impedance means coupled to the brake and drive windings of the motor and responsive to said D.C. signal for controlling the energization of the windings in opposite senses in order to cause the motor speed to coincide with the setting of the speed selector.

5. An arrangement for automatically controlling an electric motor at any one of a number of selectable speeds comprising:

a drive motor having continuously energized drive and brake windings;

means for connecting the drive windings to a source of electrical power, said means comprising a variable impedance element;

means coupled to the motor shaft for generating a first electrical signal having a frequency related to the speed of rotation of said shaft;

means for generating a second electrical signal having a fixed delay with respect to the first signal;

means for comparing the first and second signals for developing a correction signal in accordance with the comparison;

and means for controlling the impedance of the electrical power source connecting means to produce a change in the current of the motor drive windings in one direction while producing a change in the current applied to the brake winding in the other direction in response to said correction signal in order to cause the motor speed to coincide with the selected speed.

6. A speed control arrangement for an electric motor comprising:

a drive motor having continuously energized drive and brake windings;

means for connecting the drive windings to a source of electrical power;

a speed detector coupled to the electric motor for generating signals indicative of motor speed;

a source of pulses having a fixed delay relative to the motor speed signals;

means for comparing the signals from the speed detector with the delayed pulses in order to develop a correction signal having a magnitude and polarity corresponding to the deviation in symmetry between the two compared signals;

a variable impedance element responsive to the correction signal;

means for connecting the drive windings of the motor to a source of electrical power, said connecting means comprising a transformer having first and second windings, the first winding being connected in series with the drive windings;

and means connecting the variable impedance across the secondary winding of said transformer and in shunt with the brake winding of the motor so that, as the impedance of the variable impedance means is reduced in response to a correction signal, the current in the brake winding is correspondingly reduced whereas the current in the motor drive windings is increased, or vice versa.

7. An arrangement for controlling the speed of an electric motor comprising:

a drive motor having continuosly energized drive and brake windings;

means including a variable impedance connected in series with the motor drive windings for connecting such windings to a source of electrical power;

and means for simultaneously varying the respective energization levels of the drive and brake windings in opposite senses in response to deviations in the speed of the motor from a preselected speed setting comprising, a motor speed detector for generating electrical signals indicative of motor speed;

a source of fixed delay pulses generated in response to the motor speed signals;

and means for comparing the relative timing of the signals from the speed detector and the fixed delay pulses in order to develop a correction signal for producing said energization variations.

8. An electrical circuit for automatically controlling an electric motor at a selected speed setting comprising:

means for generating a signal indicative of motor speed;

a first comparator responsive to the motor speed signal for developing a first error signal, said first comparator including a fixed delay pulse source and a bistable circuit responsive to the delay pulse and the motor speed signals for developing an alternating signal having an asymmetry characteristic representative of the motor speed, and means for developing the first error signal as a D.C. signal having an amplitude and polarity corresponding to the asymmetry characteristic;

a second comparator coupled to receive the motor speed signal for developing a second error signal;

a reference frequency source coupled to the second comparator, the second comparator including a bistable phase comparator circuit responsive to the motor speed signal and pulses from the reference frequency source;

and means for combining said first and second error signals and for controlling the torque developed by the motor in response to the combined first and second error signals to produce a motor speed corresponding to the selected speed setting.

9. A speed control arrangement for an electric motor comprising:

a motor having at least one drive winding; speed detecting means mechanically coupled to said motor for providing an electrical signal indicative of motor speed;

means connected to the speed detecting means for successively dividing the frequency of said electrical signal into a plurality of binary subharmonics;

a time base reference;

means for comparing a selected one of said subharmonics with said time base reference;

and means responsive to said comparing means for controlling the hysteresis loss in said motor and the driving power supplied to said motor in opposite senses in order to regulate the speed of said motor at a selected speed setting.

10. A speed control arrangement in accordance with claim 9 wherein said controlling means comprises a brake winding coupled to said motor;

means coupling said brake winding and said drive winding to a source of electric power;

and means for oppositely varying the energy supplied said brake winding and the energy supplied said drive winding in response to a signal indicative of motor speed deviation from said selected speed setting.

11. A speed control arrangement in accordance with claim 9 wherein, said controlling means comprises a pair of oppositely poled, unilateral current conducting devices connected to said drive winding, one of said devices being controllable to vary the relative magnitudes of the D.C. and A.C. components of the electrical power supplied to said motor drive winding.

12. An arrangement for controlling the speed of an electric motor comprising:

a motor having at least one drive winding;

a variable impedance means in series with said winding;

motor speed detecting means coupled to the motor;

means for dividing the signal from the motor speed detecting means to produce a plurality of binary subharmonics thereof;

means for selecting one of said subharmonics for comparison both with a reference frequency and with a fixed delay timing reference;

and means for controlling said variable impedance in response to a signal indicative of the combined results of said comparisons in order to control the speed of the motor in accordance with the setting of said selecting means.

13. An arrangement in accordance with claim 12 wherein, said variable impedance means comprises a unilateral conducting means having its conduction controllable by said indicative signal.

14. An arrangement in accordance with claim 12 wherein, said variable impedance means comprises a transformer having a winding in series with the motor drive winding;

and said impedance controlling means includes a brake winding coupled to the motor;

a shunt control amplifier connected to said brake winding and said transformer;

and means for varying the output of the shunt control amplifier in order to control both the current applied to said brake winding and the load reflected through said transformer in series with said drive winding in the same sense.

15. An electrical circuit for automatically controlling the speed of an electric motor comprising:

a drive motor having continuously energized drive and brake windings;

means for connecting the drive windings to a source of electrical power;

means coupled to the motor windings for varying the energization levels of the respective windings simultaneously in opposite senses in response to a correction signal;

motor speed indicating means;

a reference frequency source;

means coupled between the reference frequency source and the speed indicating means for comparing the respective signals therefrom;

and means connected between the comparing means and the motor coupled means for applying an appropriate correction signal corresponding to said comparison to the motor coupled means.

16. An electrical circuit in accordance with claim 15 wherein, the comparing means comprises both a time base comparator for coarse control and a phase comparator for fine control of drive motor speed.

References Cited by the Examiner

UNITED STATES PATENTS

| | | | |
|---|---|---|---|
| 2,636,157 | 4/53 | Pell | 318—302 |
| 2,866,143 | 12/58 | Maxwell | 318—314 X |
| 2,945,997 | 7/60 | Kennedy | 318—341 |
| 3,005,940 | 10/61 | Johnson | 318—341 X |
| 3,084,307 | 4/63 | Landis | 318—328 X |
| 3,090,901 | 5/63 | Shaw | 318—302 X |
| 3,097,267 | 7/63 | Clark et al. | 318—314 X |

MILTON O. HIRSHFIELD, *Primary Examiner.*